J. C. FESLER & G. D. PETTINGELL.
HARVESTER GUARD-FINGER.
No. 187,527. Patented Feb. 20, 1877.
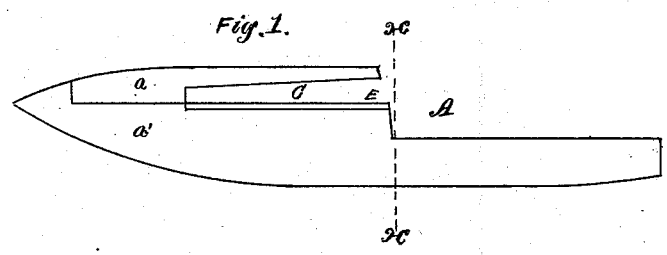
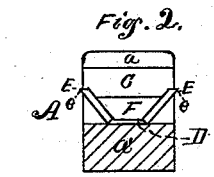
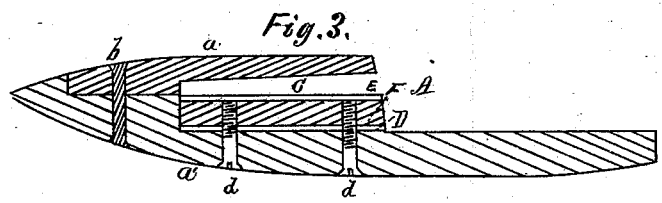
Witnesses:
N. H. Sherburne.
N. Cowles
Inventor:
James C. Fesler
George D. Pettingell
By Gridley & Sherburne
Attys

UNITED STATES PATENT OFFICE.

JAMES C. FESLER AND GEORGE D. PETTINGELL, OF KINGS, ILLINOIS.

IMPROVEMENT IN HARVESTER GUARD-FINGERS.

Specification forming part of Letters Patent No. 187,527, dated February 20, 1877; application filed June 19, 1876.

*To all whom it may concern:*

Be it known that we, JAMES C. FESLER and GEORGE D. PETTINGELL, of Kings, in the county of Ogle and State of Illinois, have invented new and useful Improvements in Sickle-Guards for Mowing-Machines; and we do hereby declare the following to be a full, clear, and exact description thereof, which will enable others skilled in the art to which it appertains to make and use the same, reference being had to the accompanying drawing, forming part of this specification, in which—

Figure 1 represents a side view of a sickle-guard embodying our invention. Fig. 2 represents a cross-section of the same, taken on the line $x\ x$, Fig. 1; and Fig. 3 represents a longitudinal central section of the same.

Like letters of reference indicate like parts.

The object of our invention is to provide a sickle-guard having cutting-edges, to act in conjunction with the cutting-edges of the sickle-sections, so as to more easily and perfectly cut grass or grain without clogging the sickle; and our invention consists in the construction and arrangement of the several parts of the sickle-guard, as hereinafter more fully described.

In the drawing, A represents the guard proper, which is made in two parts, $a$ and $a'$, of wrought or malleable iron, and so shaped as to admit of being permanently attached to the sickle-arm, in the usual manner. The part $a$ is firmly secured to the part $a'$ by screws or rivets, as shown at $b$ in Fig. 3, and its rear part is cut away on its lower side, so as to form a slot, C, between it and the upper surface of the part $a'$, and through which the sickle-sections freely pass. The part $a'$ is provided immediately under the slot C with a longitudinal groove or channel, D, the side walls of which are beveled outward on an incline of about forty-five degrees to the plane of the upper surface of the guard, as shown in Fig. 2. E E are the cutters, which consist of flat strips of sheet-steel, so adjusted as to rest upon the inclined surface of the side walls of the groove, and extend upward to or slightly above the plane of the upper surface of the part $a'$. F is a metal key, which is so beveled as to fit firmly against and upon the upper surface of the cutters, as shown in Fig. 2. $d$ $d$ are set-screws, which pass upward through the part $a'$ into the key F, as shown in Fig. 3, and are so adjusted that when properly tightened the key is drawn against the cutters, so as to compress the cutters between the inclined surfaces of the key and side walls of the groove, thereby holding the cutters at any desired adjusted point. The upper edge of each cutter is beveled, so as to bring the plane of its edge parallel with the plane of the upper surface of the part $a'$, so as to form cutting-edges $e\ e$, which bear against the lower surface of the sickle-sections, so that when the sickle is made to reciprocate the grass or grain is caught between the edges of the sickle-sections and the cutters, and is thereby cut.

By arranging the cutters as described they are kept sharp by the friction of the sickle-sections moving against them, and when worn so as not to come in contact with the sickle-sections, they are readily adjusted to bring them in contact therewith by loosening the set-screws and raising the cutters to the proper position, and again tightening the set-screws.

Having thus described our invention, what we claim as new, and desire to secure by Letters Patent, is—

1. The combination, with the part $a'$ of the guard, of the adjustable cutters E E, arranged at an angle to the plane of the upper surface of the guard, substantially as and for the purpose specified.

2. The combination, with the part $a$ of the guard, provided with the longitudinal groove D, having the inclined side walls, of the cutters E E and key F, substantially as and for the purpose specified.

JAMES C. FESLER.
GEORGE D. PETTINGELL.

Witnesses:
CHAS. SECHLER,
WILLIAM SECHLER.